US007068827B2

(12) United States Patent
Jeong et al.

(10) Patent No.: US 7,068,827 B2
(45) Date of Patent: Jun. 27, 2006

(54) SYSTEM AND METHOD OF MEASURING FAT CONTENT IN TARGET ORGAN AND RECORDING MEDIUM OF RECORDING FAT CONTENT MEASURING PROGRAM

(75) Inventors: Ji Wook Jeong, Daejon-Shi (KR); Soo Yeul Lee, Daejon-Shi (KR); Seung Hwan Kim, Daejon-Shi (KR)

(73) Assignee: Electronics and Telecommunications Research Institute, Daejon (KR)

( * ) Notice: Subject to any disclaimer, the term of this patent is extended or adjusted under 35 U.S.C. 154(b) by 756 days.

(21) Appl. No.: 10/329,703

(22) Filed: Dec. 27, 2002

(65) Prior Publication Data

US 2004/0125995 A1    Jul. 1, 2004

(30) Foreign Application Priority Data

Sep. 26, 2002 (KR) ............... 10-2002-0058345

(51) Int. Cl.
*G06K 9/00* (2006.01)
(52) U.S. Cl. ................. 382/128; 600/442
(58) Field of Classification Search ............... 382/128; 600/442, 443

See application file for complete search history.

(56) References Cited

U.S. PATENT DOCUMENTS 5,960,105 A * 9/1999 Brethour .............. 382/141
6,099,473 A * 8/2000 Liu et al. .............. 600/449
6,999,549 B1 * 2/2006 Sabol et al. ............. 378/5

OTHER PUBLICATIONS

Claudio Ricci, et al.; Noninvasive in vivo quantitative . . . ; Journal of Hepatology; 1997 : 27: 108-113.
Eun Joo Yun, et al.; Differentiation of Hepatocellular Carcinoma from Hemangioma . . ; J Korea Soc Med Ultrasound 1997; 16: 209-213.
Hiroyuki Osawa, et al.; Sonographic Diagnosis of Fatty Liver Using . . ; Journal of Clinical Ultrasound; 24:Jan. 25-29, 1996.

* cited by examiner

*Primary Examiner*—Jingge Wu
*Assistant Examiner*—Tom Y. Lu
(74) *Attorney, Agent, or Firm*—Mayer, Brown, Rowe & Maw LLP

(57) ABSTRACT

A system and method capable of measuring the fat content in the target organ by the gray level distribution of pixels forming a ultrasonic section image and a recording medium of recording a fat content measuring program are disclosed. In order to quantify the fat content of the target organ from the information of the stored ultrasonic section image, a target section and a comparative section in each of the longitudinal sections are set, and a representative gray level value of the respective section is calculated, thereby the fat content of the target section is quantified in a numerical value relative to the representative gray level value of the comparative section.

11 Claims, 3 Drawing Sheets

US 7,068,827 B2

SYSTEM AND METHOD OF MEASURING FAT CONTENT IN TARGET ORGAN AND RECORDING MEDIUM OF RECORDING FAT CONTENT MEASURING PROGRAM

BACKGROUND OF THE INVENTION

1. Field of the Invention

The present invention relates to a system and a method of measuring fat content in a target organ and a recording medium of recording a fat content measuring program. More particularly, it relates to a system and a method of measuring a fat content in a target organ capable of measuring the fat content in the target organ by quantifying a representative gray level in the target organ from the gray level distribution of pixels in a ultrasonic section image in the target organ and a recording medium of recording a fat content measuring program.

2. Description of the Prior Art

The increase on fat content in a target organ of human body brings about various complications and the increase itself involves the dangerousness of functional disorder. For example, the fatty liver means the state that the liver cell in the human body unusually contains the excessive fat content, and does not cause a pain and has no subjective symptoms in itself. For a healthy person, the slight degree of the fatty liver can be brought about, but, in case where the degree of the fat is serious, it is frequently developed into complications or liver cirrhosis. Recently, since the modems are very concerned about food life and fatness, their interests are concentrated on the measurement of the degree of the organ fat content. Accordingly, the development of an inexpensive method of easily measuring the degree of the fat content in the organ has been required.

It is known that the fatty liver is closely related to the actual fat content in the hepatocyte, and, accordingly, various methods of measuring the quantified fat content have been suggested or used. Nevertheless, the development of the method of easily measuring the degree of the fat content of the organ at low prices has been successively required.

For example, computed tomography (CT) is used in obtaining the longitudinal section image of the organ in the human body. The CT has merits that the image resolution is high and the ratio of the fat to the other components can be accurately separated in the image, without being relatively affected from the photographing technique and the photographing condition, and, accordingly, the research for the CT has been actively processed. Nevertheless, the CT requires very high cost and has a problem in safety, because of radioactive exposure.

In addition, in order to measure the fat content in the organ, liver biopsy is performed. The liver biopsy uses a method of separating the organ, for example, liver tissue and analyzing the tissue and constituent thereof, and provides accurate result in all the liver disease diagnosis. Nevertheless, the procedure thereof is complicated and invasive. Also, in case where symptoms of the disease do not appear, it is difficult that it is applied to prevent the disease, because the liver biopsy is not performed.

The ultrasonic imaging method is widely used in the diagnosis of the organ by obtaining the longitudinal section image of the organ, for example, the image of an abdominal longitudinal section. Such ultrasonic imaging method is relatively cheap and simple. Also, the ultrasonic imaging method is safe and is not invasive because it does not use the radiation. Nevertheless, there are problems that the effect of the photographing condition and the photographing technique for the quality of the ultrasonic image is dominant and the reflection characteristics on the portion through which the ultrasound passes and the resolution thereof is not uniform. Therefore, when various kinds of diagnoses are performed through using a photographed image, the arbitrary analysis of the diagnostician is easily intervened. Accordingly, the reliability of the diagnosis is not perfectly obtained.

In case where the fatty liver index is clinically determined by using the image based on the ultrasonic imaging method, there are four levels composed of normal, mild, moderate, and severe levels. Even diagnosis specialists often determined the level inaccurately and an error probability reaches 20% at a maximum.

Therefore, the development of the method capable of providing the quantified fat content by using the simple cheap ultrasonic image which do not depend on the photographing condition is very required. The experiments for measuring the fat content by using only the ultrasonic image has been reported, but the basic problems of the ultrasonic imaging method are not solved. For example, it is difficult that the fat content is quantified and the reliability is secured, because of the distortions of the image characteristics and the gray level distribution due to the irregularity of the resolution.

SUMMARY OF THE INVENTION

Thus, the object of the present invention is to provide a system of quantifying the gray level distribution characteristics of a target organ from the image of the target organ obtained by an ultrasonic imaging method, extracting a representative gray level value, and quantifying the fat content from the representative gray level value.

In order to solve the above-mentioned problems, according to an aspect of the present invention, a system of measuring a fat content in a target organ, comprising an ultrasonic photographing portion for photographing the ultrasonic section image; a storing portion for storing the information of said ultrasonic section image such that each of pixels has gray level value distribution; an operating portion having a section setting portion for setting a target section and a comparative section in each of longitudinal sections, a representative gray level value calculating portion for obtaining a representative gray level value of the respective section, and a fat content quantifying portion for quantifying the fat content of the target section in a numerical value relative to the representative gray level value of said comparative section, in order to quantify the fat content of the target organ from the stored information of the ultrasonic section image; and an input/output portion for inputting a signal for controlling said operating portion or outputting the operating result thereof is provided.

The terms "target organ" means a mass of the organ in the body of the animal including a human and is not limited to a specific kind. For example, there are a liver, a spleen, kidney. Preferably, in case of containing the blood vessel or in case of the organ having the blood vessel in the periphery thereof, the system according to the present invention can be effectively applied. Preferably, the ultrasonic section image may include a blood vessel wall and blood or may include the liver of a human body.

The representative gray level value in each of the sections may be obtained by determining any one of the gray level values in the section. Also, the representative gray level value in the section may be a maximum gray level value, a minimum gray level value, or a boundary value in the section.

On the other hand, the quantified representative gray level value of the target section may be determined to the average value of the quantified representative gray levels in a plurality of the longitudinal sections.

In addition, the quantified representative gray level value of the target section can be obtained by obtaining the histogram distribution showing the number of the longitudinal sections with respect to the comparative section in each of the longitudinal section (for example, the comparative section having a maximum gray level value) among the representative gray level values of a plurality of the longitudinal sections, averaging the quantified representative gray level value in the longitudinal section of a portion among the histogram distribution, and determining the quantified representative gray level value of the target image. Preferably, on the basis of the comparative section having the maximum gray level value in each of the longitudinal sections, the longitudinal section having the maximum gray level value higher than a reference value becomes a set region, and the representative gray level value of the target section in the longitudinal section is quantified. The reference value may be the maximum gray level value having the number of the longitudinal sections of a maximum frequency.

According to the other aspect of the present invention, a recording medium for recording a program of measuring a fat content from an ultrasonic section image of a liver including a blood vessel wall and blood, the method of measuring the fat content comprising the steps of storing the ultrasonic section image of said liver such that each of pixels has gray level distribution; setting a target section and a comparative section in each of longitudinal section from the stored ultrasonic section image of said liver; obtaining representative gray level values of the target section and the comparative section in each of the longitudinal sections; and quantifying the fat content of the target section in a value relative to the representative gray level value of said comparative section is provided.

In addition, after the step of quantifying the fat content, the steps of obtaining an actual fatty liver index of said ultrasonic section image; obtaining a proportional function between said quantified fat content and said fatty liver index of the target section; and obtaining the fatty liver index corresponding to the quantified fat content by using said proportional function may be further included.

BRIEF DESCRIPTION OF THE ATTACHED DRAWINGS

Figure 2:
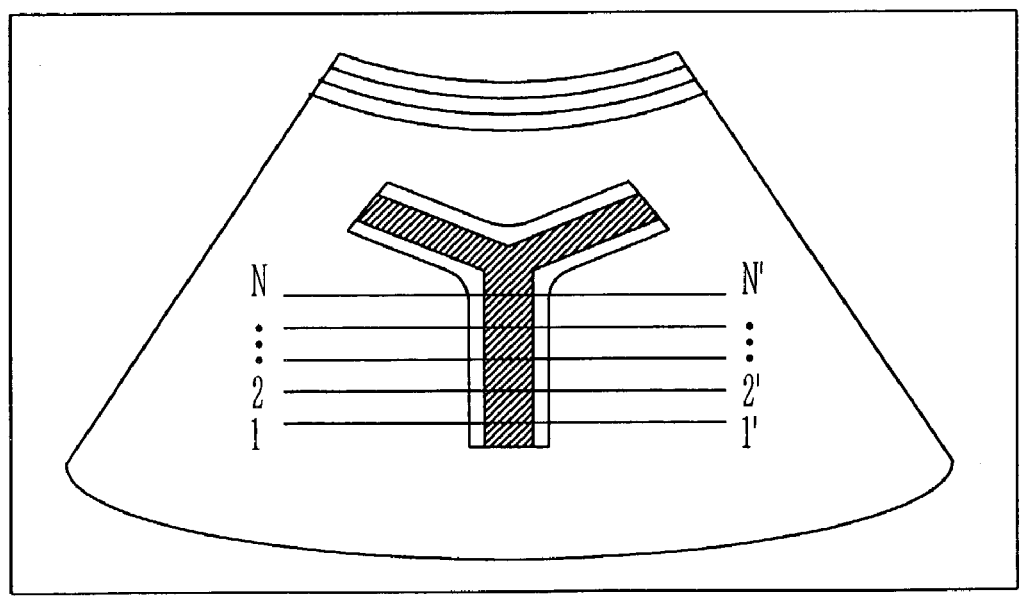
FIG. 2 illustrates an example of the image obtained by an ultrasonic imaging method.
Figure 3:
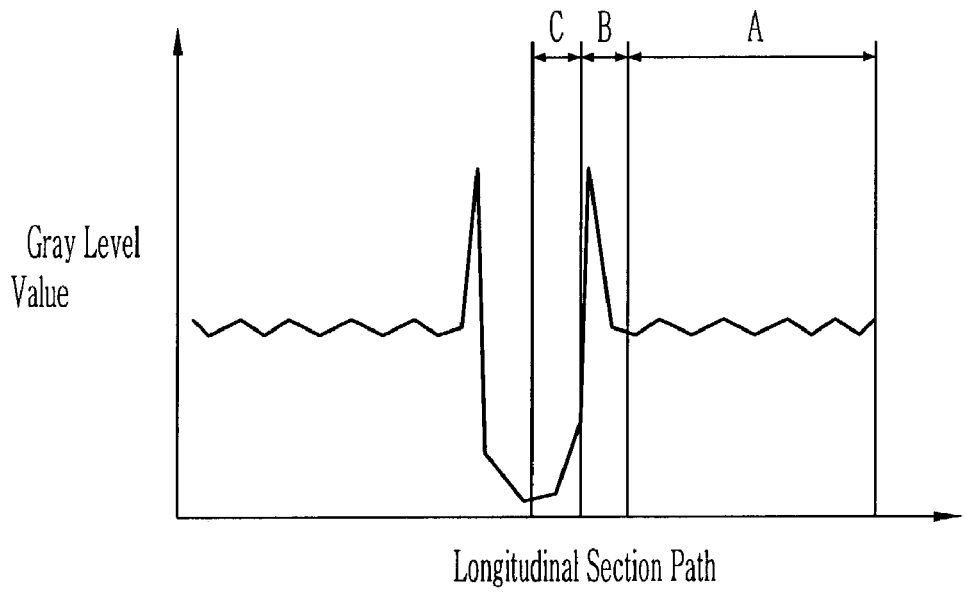

FIG. 3 schematically illustrates curvilinear gray level distribution of a longitudinal section in FIG. 2.

Figure 4:
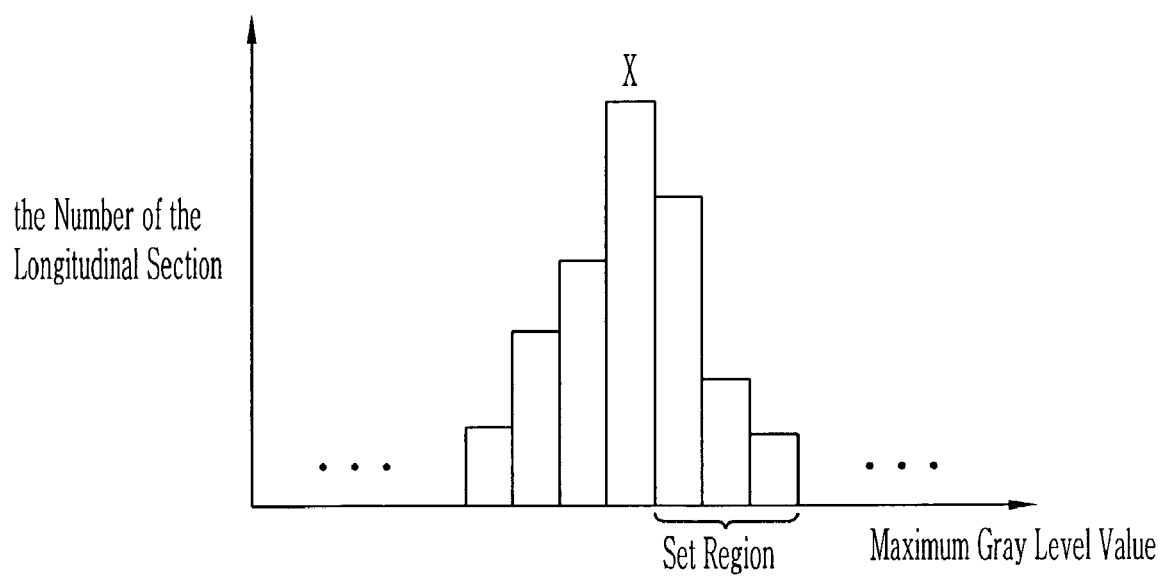

FIG. 4 is a histogram illustrating distribution of the number of longitudinal section in association with the representative gray level value of the section.

Figure 5:
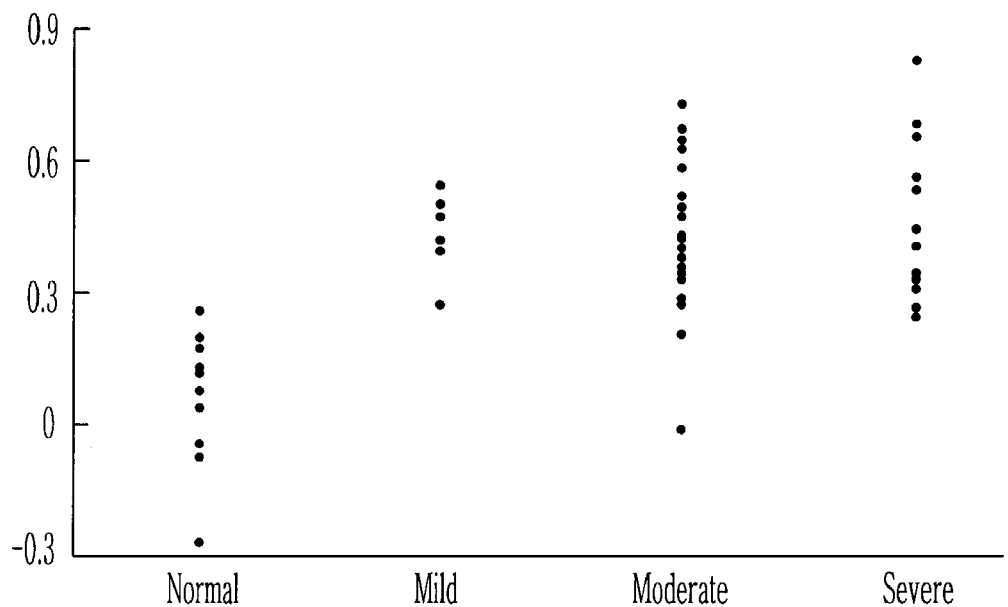

FIG. 5 is a graph illustrating correlation between a fatty liver index and a quantified representative gray level value.

Figure 6:
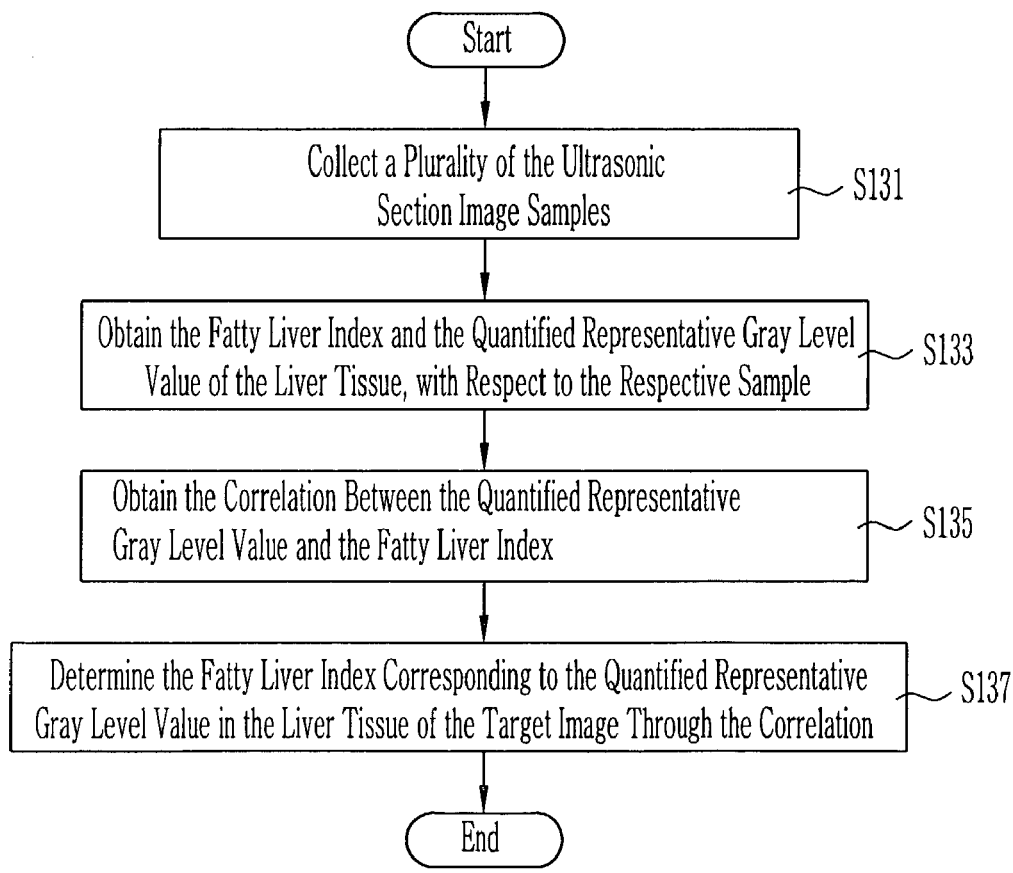

FIG. 6 is a flowchart showing a method of measuring the fat content in the target organ according to the embodiment of the present invention.

DESCRIPTION OF THE PREPERRED EMBODIMENT

Hereinafter, the embodiments of the present invention will be explained with reference to the accompanying drawings. However, these embodiments are provided so that those skilled in the art can understand the present invention and it may be variously changed, and the present invention should not be understood as limited to the specific embodiments thereof. Particularly, in the present embodiment, the liver is explained as the target organ, but the target organ is not limited to the liver.

As the fat content is increased in the interest organ(target organ) of the human body, it has a tendency of the variation in the reflection/refraction. In the invention, from the ultrasonic image the variation is indexed and the content is calculated by using the indexed variation.

The ultrasonic image, for example, the ultrasonic abdominal section image of the human body is reconstituted in two-dimensional image with the process of converting the reflection/refraction characteristics of the respective tissue of the living body into the gray level values. As the primary constituents of the tissue of the living body, there are the fat and water, and the ultrasound has different reflection characteristics with respect to the fat and the water. The image of the fat region appears bright. Accordingly, the gray level or the brightness degree of the each pixel of the photographed abdominal section image is proportional to the fat content in the tissue of the living body corresponding to the pixel.

However, it can not be considered that the gray level or the brightness degree of the pixel directly corresponds to the fat content of the interest organ. Because the gray level itself can vary in accordance with the ultrasonic abdominal section photographing condition and the photographing technique, it is difficult that it is used as the index of the fat content. In other words, though the ultrasonic abdominal section image is photographed with respect to a same target, the gray levels of the two images having a different photographing condition in a same location or the gray levels of the pixels in the same location can become different from each other. Accordingly, it is difficult that the gray level of the ultrasonic image is directly used as the fat content.

In order to overcome this problem, in the embodiment of the present invention, a representative gray level value of the interest organ region, that is, the target region is extracted and is quantified, thereby the fat content is calculated. In other words, under the condition that the quantified representative gray level value of the ultrasonic section image is obtained, for example, the effect of the photographing condition is eliminated, thereby the representative gray level value can be used as the index value of the fat content.

Figure 1:
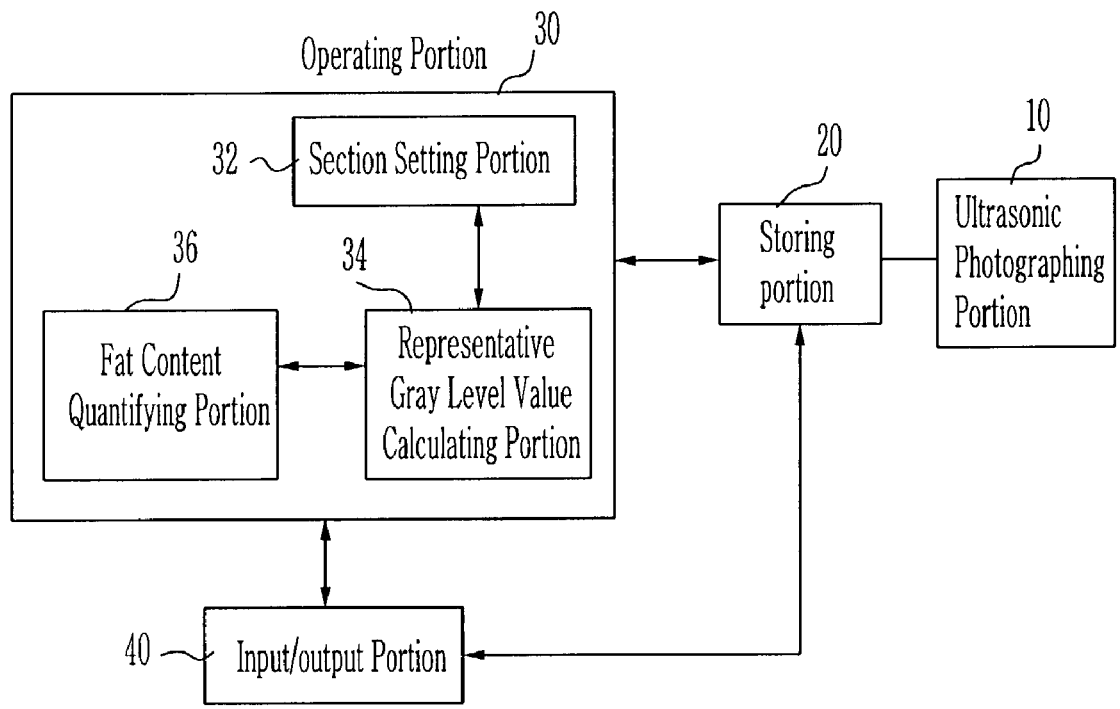
FIG. 1 is a block diagram showing a system of measuring the fat content in a target organ according to an embodiment of the present invention.

FIG. 1 is a block diagram showing the system of measuring the fat content in the target organ according to an embodiment of the present invention.

The fat content measuring system comprises an ultrasonic photographing portion 10 which is a general ultrasonic photographing equipment, a storing portion 20 for storing the photographed image data, an operating portion 30 having a section setting portion 32 for setting a target section and a comparative section, a representative gray level value calculating portion 34 for obtaining a representative gray level value of the respective section, and a quantifying portion 36 for quantifying the fat content from the representative gray level value in order to quantify the fat content of a target organ, and an input/output portion 40 for inputting the signal for controlling data stored in the storing portion 20 or outputting the obtained results.

For example, in case of ultrasonic image of the abdominal section, the ultrasonic image photographed by the ultrasonic photographing portion 10 is obtained by photographing the abdomen of the human body in an ultrasonic imaging method. In case of photographing the abdominal section in the ultrasonic imaging method, it is preferable that the photographing angle and the contact degree are adjusted to uniform the gray level distribution in the image. In addition, it is preferable that the hepatic portal vein structure is included to contain the section of the liver hepatocyte, the blood vessel wall, and the blood to be photographed in the image, if possible. On the other hand, this ultrasonic photographing portion 10 uses general ultrasonic photographing equipment.

The storing portion 20 may store the ultrasonic image of the abdominal section obtained by the ultrasonic photographing portion 10 and various kinds of the values calculated by the operating portion 30. For example, if the ultrasonic image is stored in the form of a BMP file, it is composed of the pixels having the gray level value in the range of 0–255, and the number of the pixel can be set to 500×700.

The setting portion 32 sets the liver hepatocyte in a plurality of longitudinal sections in the ultrasonic image of the abdominal section to the target section, together with the comparative section for quantifying the representative gray level value extracted with respect to the target section. Referred to FIGS. 2 and 3, this will be explained in detail. As the comparative section for quantifying the liver hepatocyte, the target section, the organ of which the ultrasonic echo characteristics is maximum in the human body or the organ of which the ultrasonic echo characteristics is minimum in the human body can be selected. In the embodiment of the present invention, the blood vessel wall section B of which the ultrasonic echo characteristics is maximum is set to a first comparative section, and the blood section C of which the ultrasonic echo characteristics is minimum is set to a second comparative section. The gray level values of the longitudinal sections of lines 1–1' to N–N' in FIG. 2 are shown in FIG. 3.

The representative gray level value-calculating portion 34 extracts the representative gray level values of the target section that is the liver hepatocyte A and the comparative sections B and C. After the gray level distribution of the pixels is obtained, the representative gray level value of the respective section is determined. Concretely, as shown in FIG. 3, it is noted that the gray level of the blood vessel wall section B is relatively high, the gray level of the blood section C is relatively low, and the gray level of the liver hepatocyte is middle. Therefore, the blood vessel wall section B and the blood section C can be set to the first and second comparative section, respectively.

Since the blood vessel wall section B has the strong echo characteristics independent of the progress of the fatty liver, it is preferable that the portion having a high gray level value is extracted as a comparative target for quantifying the representative gray level value of the target section. The representative gray level value of the first comparative section, which is the blood vessel wall section B, can be determined to about 175.6 by the above-mentioned extracting method.

Similar to the method of obtaining the representative gray level value of the first comparative section, the representative gray level value of the second comparative section is determined. For example, the blood section C in which the fat content is low can be set to the second comparative section. The reference numeral C in FIG. 3 indicates the second comparative section set to the blood section.

Since the blood section C is mainly composed of the water and has low fat content, it is preferable that the portion having a low gray level value is extracted as a comparative target for quantifying the representative gray level value of the target section. The representative gray level value of the second comparative section which is the blood section C can be determined to about 39.3 by the above-mentioned extracting method.

With similar method, the representative gray level value of the liver hepatocyte A, which is the target section, is obtained. Concretely, since the liver hepatocyte A, which is the target section, has comparatively a uniform fat distribution over all, a portion of the longitudinal section is set to the set section and the gray level values of the pixels in the set section are analyzed, thereby the representative gray level value can be extracted. After the gray level distribution of the pixels in the set section A of the longitudinal section is obtained, the representative gray level value is extracted from the gray level value distribution. Concretely, for example, after the gray level value distribution shown in FIG. 3 is obtained, the noise is removed. A local average method is used in removing the noise. FIG. 3 schematically illustrates the gray level value distribution of the target section. The gray level value distribution shown in FIG. 3 can be schematized in an oscillating curve. The average of the values in the gray level value distribution is calculated to determine the gray level value in this section as the representative gray level value. In this case, the representative gray level value of the target section, which is the liver hepatocyte section, for example, 153.6.

On the other hand, as an alternative method of calculating the representative gray level values of the sections, the representative gray level value of the section can be obtained by determining any one of the gray level value in the section, or can be obtained by determining the average of the gray level distribution in the section. Also, the representative gray level value of the section may be a maximum gray level value, a minimum gray level value, or a boundary value in the section.

The fat content quantifying portion 36 quantifies the representative gray level value of the target section to a relative numerical value, with respect to comparative regions of the ultrasonic abdominal section region including the target section. For example, with respect to the representative gray level value of the first comparative section which is the blood vessel section B having the maximum echo characteristics and the representative gray level value of the second comparative section which is the blood section C having the minimum echo characteristics, the representative gray level value of the target section is quantified or standardized in the relative numerical value.

Concretely explaining the quantifying method, when the representative gray level value of the target section is P, the representative gray level value of the first comparative section is Q, and the representative gray level value of the second comparative section is R, the quantified value to be obtained P' can be obtained by calculating in a function of f(P; Q, R), and can be obtained by using, for example, the equation (1).

$$P'=(P-R)/(Q-R) \qquad (1)$$

Accordingly, the gray level value of the target section can be obtained as the quantified numerical value. Such function is not limited to the abovementioned function, but, if the function increases monotonically, any function may be used.

The representative gray level value of the target section quantified by calculating the above-mentioned function is determined to (153.6−39.3)/(175.6−39.3)=0.839. Since the representative gray level value of the target section is quantified in the range of 0–1 as a value relative to the comparative section, it can be compared with the numerical value obtained from a different ultrasonic section image.

On the other hand, as the method of improving the accuracy, the quantified representative gray level value of the target section in each of the sections (1–1' to N–N' in FIG. 2) is obtained as mentioned above and the histogram distribution thereof associated with the representative gray level value of the blood vessel wall section is obtained. Because the blood vessel wall section has very high echo characteristics, the quantified representative gray level values of the target sections in the longitudinal sections are averaged, with respect to the set region having a high representative gray level value in the blood vessel wall section in the histogram distribution, thereby the quantified representative gray level value of the target image is obtained.

An actual fat content is calculated from the obtained quantified representative gray level value of the target section. In other words, the number of the longitudinal sections corresponding to the gray level value (maximum gray level value) of the blood vessel wall section is calculated to form the histogram in FIG. 4. Here, the quantified gray level value of the liver hepatocyte calculated in the longitudinal sections can be used by selecting only the histogram having a gray level value higher than X of a maximum histogram. The method of selecting the set region is not necessarily limited to that.

Next, the correlation between the quantified representative gray level value and the fatty liver index of the respective sample is obtained. FIG. 5 is a graph showing the correlation between the quantified representative gray level value and the fatty liver index. Here, the fatty liver index used therein uses the result determined by an actual clinical specialist and the quantified representative gray level value shows the quantified gray level values of the liver hepatocyte of the longitudinal sections selected in FIG. 4. The proportional function between the fatty liver index and the quantified representative gray level value is obtained in a least square method. The proportional function can be shown in a proportional increasing line in FIG. 5. Like this, the degree of the fat content of the target organ can be quantitatively estimated by using the correlation between the quantified representative gray level value and the fatty liver index.

Hereinafter, the method of measuring the fat content of the target organ according to the embodiment of the present invention will be explained with reference to FIG. 6. The measuring method is recorded in the recording medium in the form of a computer program and is performed in the operating portion 30 in FIG. 1.

First, a plurality of the ultrasonic section image samples is collected (step S131). The hepatic portal vein structure must be contained so that the sections of the liver hepatocyte, the blood vessel wall, and the blood are photographed, without omission.

Next, with respect to the respective sample, the fatty liver index of the liver tissue and the quantified representative gray level value are obtained (step S133). The clinical fatty liver indexes of the liver tissues in the samples are collected and the quantified representative gray level values are calculated, respectively. Explaining the method of calculating the quantified gray level value of the respective sample, the ultrasonic image is obtained and the comparative sections and the target section are set, within the respective longitudinal section. In this case, in the embodiment of the present invention, it is preferable that the blood vessel wall section having the maximum ultrasonic echo characteristics and the blood section having the minimum ultrasonic echo characteristics are set as the comparative section. The representative gay level values of the liver hepatocyte section, the blood vessel wall section and the blood section of the respective sample are calculated. The noise is removed by using the local averaging method. Then, in order to obtain the gray level value of the target section in the quantified numerical value, the representative gray level value of the liver hepatocyte section is quantified. Subsequently, the portion having a high representative gray level value in the blood vessel wall section among the longitudinal sections having their representative gray level values becomes the set region and the quantified representative gray level values of the longitudinal section are averaged.

Next, the fatty liver indexes of the liver tissue of the respective sample are obtained, and, when the representative gray level value is calculated, the correlation function between the quantified representative gray level values and the fat content values of the actual target section is obtained (step S135).

Using the representative gray level value of the target section with the correlation function, the corresponding fatty liver index can be obtained (step S137).

Accordingly, the quantified representative gray level value obtained according to the embodiment of the present invention can be estimated or considered as the fat index.

According to the present invention, by linearly re-adjusting the gray level distribution of the pixels forming the ultrasonic section image, the ultrasonic image can be prevented from being affected from the photographing condition and the photographing technique and the representative gray level value of the target region of the interest organ can be obtained. The comparison among the ultrasonic images can be performed by quantifying the representative gray level value, thereby the degree of the fat content in the interest organ can be quantitatively measured.

Although the present invention has been illustrated and described with respect to exemplary embodiments thereof, the present invention should not be understood as limited to the specific embodiment, and it should be understood by those skilled in the art that the foregoing and various other changes, omission and additions may be made therein and thereto, with departing from the spirit and scope of the present invention.

What is claimed is:

1. A system of measuring a fat content in a target organ, comprising:

an ultrasonic photographing portion for photographing the ultrasonic section image;

a storing portion for storing the information of said ultrasonic section image such that each of pixels has gray level value distribution;

an operating portion having a section setting portion for setting a target section and a comparative section in each of longitudinal sections, a representative gray level value calculating portion for obtaining a representative gray level value of the respective section, and a fat content quantifying portion for quantifying the fat content of the target section in a numerical value relative to the representative gray level value of said comparative section, in order to quantify the fat content of the target organ from the stored information of the ultrasonic section image; and an input/output portion for inputting a signal for controlling said operating portion or outputting the operating result thereof.

2. The system of measuring the fat content in the target organ according to claim 1, wherein said ultrasonic section image includes a blood vessel wall and blood.

3. The system of measuring the fat content in the target organ according to claim 1, wherein said ultrasonic section image includes the liver image of a human body.

4. The system of measuring the fat content in the target organ according to claim 1, wherein said representative gray level value calculating portion also includes a function for removing noise in a local averaging method.

5. The system of measuring the fat content in the target organ according to claim 1, wherein said fat content quantifying portion sets the longitudinal section having a maximum gray level value higher than a reference value to a set region, on the basis of the comparative section having a maximum gray level value in each of the longitudinal sections, and quantifies the representative gray level value of the target section in the longitudinal section with an averaging method.

6. Method of measuring a fat content from an ultrasonic section image of a liver including a blood vessel wall and blood, the method of measuring the fat content comprising the steps of:

storing the ultrasonic section image of said liver such that each of pixels has gray level distribution;

setting a target section and a comparative section in each of longitudinal section from the stored ultrasonic section image of said liver;

obtaining representative gray level values of the target section and the comparative section in each of the longitudinal sections; and quantifying the fat content of the target section in a value relative to the representative gray level value of said comparative section.

7. The method according to claim 6, wherein the step of quantifying the fat content performs a step of setting the longitudinal section having a maximum gray level value higher than a reference value to a set region, on the basis of the comparative section having a maximum gray level value in each of the longitudinal sections and averaging the quantified representative gray level values of the target sections in the longitudinal sections.

8. The method according to claim 6, wherein after the step of quantifying the fat content, further comprising:

obtaining an actual fatty liver index of said ultrasonic section image;

obtaining a proportional function between said quantified fat content and said fatty liver index of the target section; and obtaining the fatty liver index corresponding to the quantified fat content by using said proportional function.

9. A record medium for recording a program of measuring a fat content from an ultrasonic section image of a liver including a blood vessel wall and blood, the method of measuring the fat content comprising the steps of:

storing the ultrasonic section image of said liver such that each of pixels has gray level distribution;

setting a target section and a comparative section in each of longitudinal section from the stored ultrasonic section image of said liver;

obtaining representative gray level values of the target section and the comparative section in each of the longitudinal sections; and quantifying the fat content of the target section in a value relative to the representative gray level value of said comparative section.

10. The recording medium according to claim 9, wherein the step of quantifying the fat content performs a step of setting the longitudinal section having a maximum gray level value higher than a reference value to a set region, on the basis of the comparative section having a maximum gray level value in each of the longitudinal sections and averaging the quantified representative gray level values of the target sections in the longitudinal sections.

11. The recording medium according to claim 9, wherein after the step of quantifying the fat content, further comprising:

obtaining an actual fatty liver index of said ultrasonic section image;

obtaining a proportional function between said quantified fat content and said fatty liver index of the target section; and obtaining the fatty liver index corresponding to the quantified fat content by using said proportional function.

* * * * *